US009055115B2

(12) United States Patent
Bell et al.

(10) Patent No.: US 9,055,115 B2
(45) Date of Patent: Jun. 9, 2015

(54) CONTENT VOLUME THROTTLING IN FEED AGGREGATORS (75) Inventors: Denise A. Bell, Austin, TX (US); Travis M. Grigsby, Austin, TX (US); Jana H. Jenkins, Raleigh, NC (US); Trevor Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 13/356,867

(22) Filed: Jan. 24, 2012

(65) Prior Publication Data

US 2013/0191740 A1  Jul. 25, 2013

(51) Int. Cl.
G06F 17/00 (2006.01)
H04L 29/08 (2006.01)
G06F 17/30 (2006.01)

(52) U.S. Cl.
CPC .......... *H04L 67/22* (2013.01); *G06F 17/30044* (2013.01); *G06F 17/30867* (2013.01); *H04L 67/26* (2013.01)

(58) Field of Classification Search
CPC .......... G06F 17/3089; G06F 17/30867; G06F 17/30702; H04L 67/26; G06Q 50/01; G06Q 10/109; H04N 21/454; H04N 21/45; H04N 21/458; H04N 21/4532; H04N 21/466; H04N 21/4662; H04N 21/4667; H04N 21/4668
USPC .................................. 707/754, 752, E17.059
See application file for complete search history.

(56) References Cited

U.S. PATENT DOCUMENTS

| | | | | |
|---|---|---|---|---|
| 6,324,570 | B1* | 11/2001 | Tonchev et al. | 709/207 |
| 7,966,219 | B1* | 6/2011 | Singh et al. | 705/26.7 |
| 8,495,210 | B1* | 7/2013 | Natarajan et al. | 709/224 |
| 8,589,418 | B1* | 11/2013 | Kane | 707/749 |
| 2002/0191775 | A1* | 12/2002 | Boies et al. | 379/266.01 |
| 2003/0191742 | A1* | 10/2003 | Yonezawa et al. | 707/1 |
| 2005/0267973 | A1 | 12/2005 | Carlson et al. | |
| 2006/0173985 | A1* | 8/2006 | Moore | 709/223 |
| 2007/0292826 | A1* | 12/2007 | Goddy et al. | 434/156 |
| 2008/0010337 | A1* | 1/2008 | Hayes et al. | 709/202 |
| 2008/0126476 | A1* | 5/2008 | Nicholas et al. | 709/203 |
| 2008/0147450 | A1* | 6/2008 | Mortimore | 705/5 |
| 2008/0155118 | A1 | 6/2008 | Glaser et al. | |
| 2009/0138472 | A1* | 5/2009 | MacLean | 707/7 |
| 2009/0158342 | A1* | 6/2009 | Mercer et al. | 725/46 |
| 2009/0164408 | A1* | 6/2009 | Grigorik et al. | 707/1 |
| 2009/0307731 | A1* | 12/2009 | Beyabani | 725/87 |
| 2010/0131455 | A1* | 5/2010 | Logan et al. | 707/602 |
| 2010/0157063 | A1* | 6/2010 | Basso et al. | 348/169 |
| 2010/0205169 | A1* | 8/2010 | Narayan et al. | 707/711 |
| 2011/0004831 | A1* | 1/2011 | Steinberg et al. | 715/753 |
| 2011/0047479 | A1* | 2/2011 | Ghosh | 715/747 |

(Continued)

OTHER PUBLICATIONS

Surat Lozowick; "Reading time: a time-based reading service and recommendation engine"; Published Mar. 27, 2011; 3 pages; http://suratlozowick.com/blog/2011/03/reading-time/.*

(Continued)

*Primary Examiner* — Scott Baderman
*Assistant Examiner* — Benjamin J Smith
(74) *Attorney, Agent, or Firm* — Jordan IP Law, LLC (57) ABSTRACT

Methods and systems of managing feed items may involve receiving a feed item and determining an estimate of an amount of time to read the feed item. In addition, the feed item can be prioritized in a feed aggregator based at least in part on the estimate of the amount of time to read the feed item.

13 Claims, 4 Drawing Sheets

(56) References Cited

U.S. PATENT DOCUMENTS

| | | | |
|---|---|---|---|
| 2011/0050591 A1* | 3/2011 | Kim et al. | 345/173 |
| 2011/0050594 A1* | 3/2011 | Kim et al. | 345/173 |
| 2011/0066613 A1* | 3/2011 | Berkman et al. | 707/734 |
| 2011/0179020 A1* | 7/2011 | Ozzie et al. | 707/723 |
| 2011/0314007 A1* | 12/2011 | Dassa et al. | 707/723 |
| 2012/0064820 A1* | 3/2012 | Bemmel | 455/3.02 |
| 2012/0084000 A1* | 4/2012 | Wang et al. | 701/426 |
| 2012/0206472 A1* | 8/2012 | Kandekar et al. | 345/581 |
| 2012/0246302 A1* | 9/2012 | Lafleur et al. | 709/224 |
| 2013/0031034 A1* | 1/2013 | Gubin et al. | 706/12 |
| 2013/0073989 A1* | 3/2013 | Harris et al. | 715/758 |
| 2013/0095857 A1* | 4/2013 | Garcia et al. | 455/456.3 |
| 2013/0262476 A1* | 10/2013 | Barak et al. | 707/748 |
| 2013/0304822 A1* | 11/2013 | Tetreault | 709/204 |

OTHER PUBLICATIONS

The Paris Review; "The Paris Review Book for Planes, Trains, Elevators, and Waiting Rooms", by The Paris Review—Picador ("2004")—Paperback—"400" pages—ISBN "0312422407".*

Cennydd "Bowles.;" "A calmer reading app"; Feb. 15, 2011; 7 pages; http://www.cennydd.co.uk/2011/a-calmer-reading-app/.*

Dave Doolin ; "Estimated Reading Time Plugin : Sharpening the stick (technical tuesday)"; May 25, 2010; 11 pages; http://website-in-a-weekend.net/extending-wordpress/estimated-reading-time-plugin-2/?.*

Jean-Baptiste Jung; "10 Useful RSS-Tricks and Hacks for WordPress"; Dec. 2, 2008; 12 pages; http://www.smashingmagazine.com/2008/12/02/10-useful-rss-hacks-for-wordpress/.*

* cited by examiner

CONTENT VOLUME THROTTLING IN FEED AGGREGATORS

BACKGROUND

Embodiments of the present invention generally relate to feed aggregators. More particularly, embodiments relate to throttling content volume in feed aggregators.

Online content may be syndicated by various content producers in the form of RSS (Resource Description Framework/RDF Site Summary) feeds, Atom feeds, etc., wherein feed aggregators can enable users to subscribe to feeds from different content producers and display the data together. Unfortunately, given the volume of feed items generated by certain types of content producers as well as an increasing number of available content sources, it may be challenging for individuals to maintain zero unread items in a feed aggregator. Moreover, determining which items to read before marking everything as read can take time, and may scale with the amount of content.

BRIEF SUMMARY

Embodiments may include a computer program product having a computer readable storage medium and computer usable code stored on the computer readable storage medium. If executed by a processor, the computer usable code may cause a computer to receive a feed item and determine an estimate of an amount of time to read the feed item. The computer usable code can also cause a computer to prioritize the feed item in a feed aggregator based at least in part on the estimate of the amount of time to read the item.

Embodiments may also include a computer implemented method in which a feed item is received and a number of words in the feed item is determined. The method can also provide for determining a content attribute associated with the feed item, wherein the content attribute includes at least one of a topic and a source of the feed item. In addition, a feed usage pattern may be determined. The method may also involve determining an estimate of an amount of time to read the feed item based on at least one of the number of words in the feed item, the content attribute and the feed usage pattern. A user availability threshold can be determined based on at least one of a user calendar and a first user input, wherein a content balance threshold may be determined based on at least one of the feed usage pattern and a second user input. The method may also provide for displaying the feed item in a feed aggregator if the estimate of the amount of time to read the feed item does not exceed the user availability threshold and the content attribute does not exceed the content balance threshold. Additionally, a display characteristic of the feed item can be modified if either the estimate of the amount of time to read the feed item exceeds the user availability threshold or the content attribute exceeds the content balance threshold.

Embodiments may also include a computer program product having a computer readable storage medium and computer usable code stored on the computer readable storage medium. If executed by a processor, the computer usable code may cause a computer to receive a feed item and determine a number of words in the feed item. The computer usable code can also cause a computer to determine a content attribute associated with the feed item, wherein the content attribute is to include at least one of a topic and a source of the feed item. Moreover, the computer usable code may cause a computer to determine a feed usage pattern, and determine an estimate of an amount of time to read the feed item based on at least one of the number of words in the feed item, the content attribute and the feed usage pattern. Additionally, the computer usable code can cause a computer to determine a user availability threshold based on at least one of a user calendar and a first user input, and determine a content balance threshold based on at least one of the feed usage pattern and a second user input. The computer usable code may also cause a computer to display the feed item in a feed aggregator if the estimate of the amount of time to read the feed item does not exceed the user availability threshold and the content attribute does not exceed the content balance threshold. In addition, the computer usable code can cause a computer to modify a display characteristic of the feed item if either the estimate of the amount of time to read the feed item exceeds the user availability threshold or the content attribute exceeds the content balance threshold.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
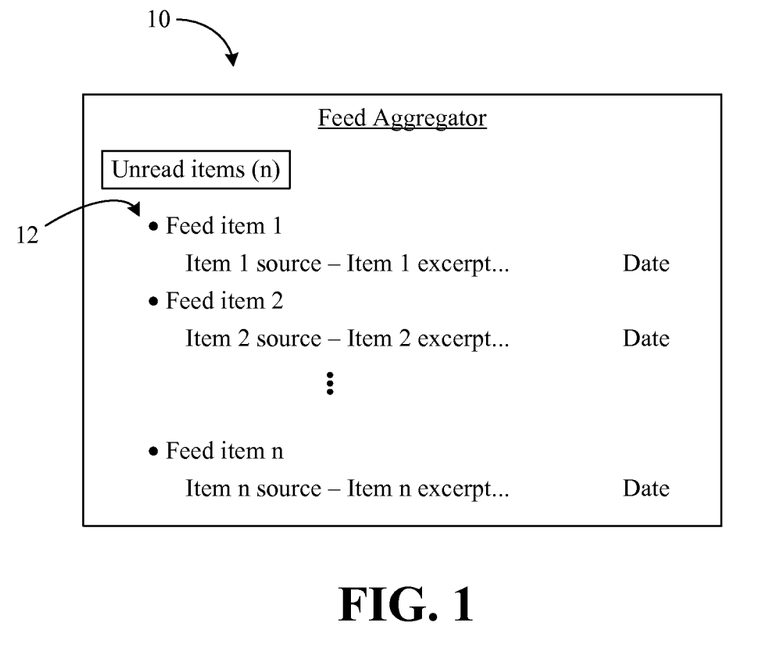
FIG. 1 is a block diagram of an example of a feed aggregator according to an embodiment.

Referring now to FIG. 1, a feed aggregator 10 is shown in which n feed items 12 from different content sources are displayed together. The sources of the feed items 12 may be selected and/or subscribed to by a user of the feed aggregator 10, wherein the content sources could be social in nature, business in nature, etc., or any combination thereof. In the illustrated example, a condensed view of the feed items 12 includes an identification of the source of the item, an excerpt from the item and a publication date of the item. Techniques described herein enable the number (e.g., "n") of feed items 12 presented to the user to be dynamically controlled based on various user-specific factors such as the amount of time the user has available to read the feed items 12, the amount of time estimated to read each feed item 12, the content of the feed items 12, historical feed usage patterns, and so forth. Simply put, these factors may be used to prioritize the feed items 12 in the feed aggregator 10 in a manner that adapts to the specific habits and requirements of the user in question.

Figure 2:
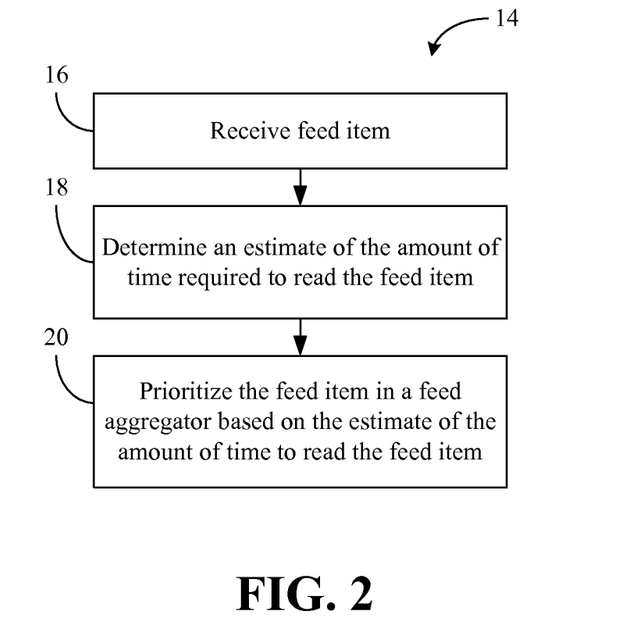
FIG. 2 is a flowchart of an example of a method of prioritizing feed items according to an embodiment.

FIG. 2 shows a method 14 of prioritizing feed items. The method 14 could be implemented in a web browser and/or feed aggregating tool running on a client device, server, other computing platform, or any combination thereof. Processing block 16 provides for receiving a feed item, wherein the feed item might be obtained over a network connection to a remote content provider such as a blog site, web site, social networking site, retailer, and so forth. An estimate of the amount of time required to read the feed item may be determined at block 18. In one example, the determination at block 18 involves identifying the number of words in the feed item, as well as making a words per minute prediction, wherein the words per minute prediction may be based on a content attribute of the feed item such as the topic and/or source of the feed item. For example, it may be determined that the user typically reads blogs more quickly than design specifications. The amount of time required to read the feed item could also be based on a feed usage pattern such as an historical assessment of the amount of time it has taken the user to read similar items in the past. Illustrated block 20 prioritizes the feed item in a feed aggregator based on the estimate of the amount of time to read the feed item. As will be discussed in greater detail, the prioritization of feed items could involve, for example, delaying the display of certain feed items, digesting multiple feed items, or canceling the display of some feed items altogether, based at least in part on the estimated amount of time to read each item.

Figure 3:
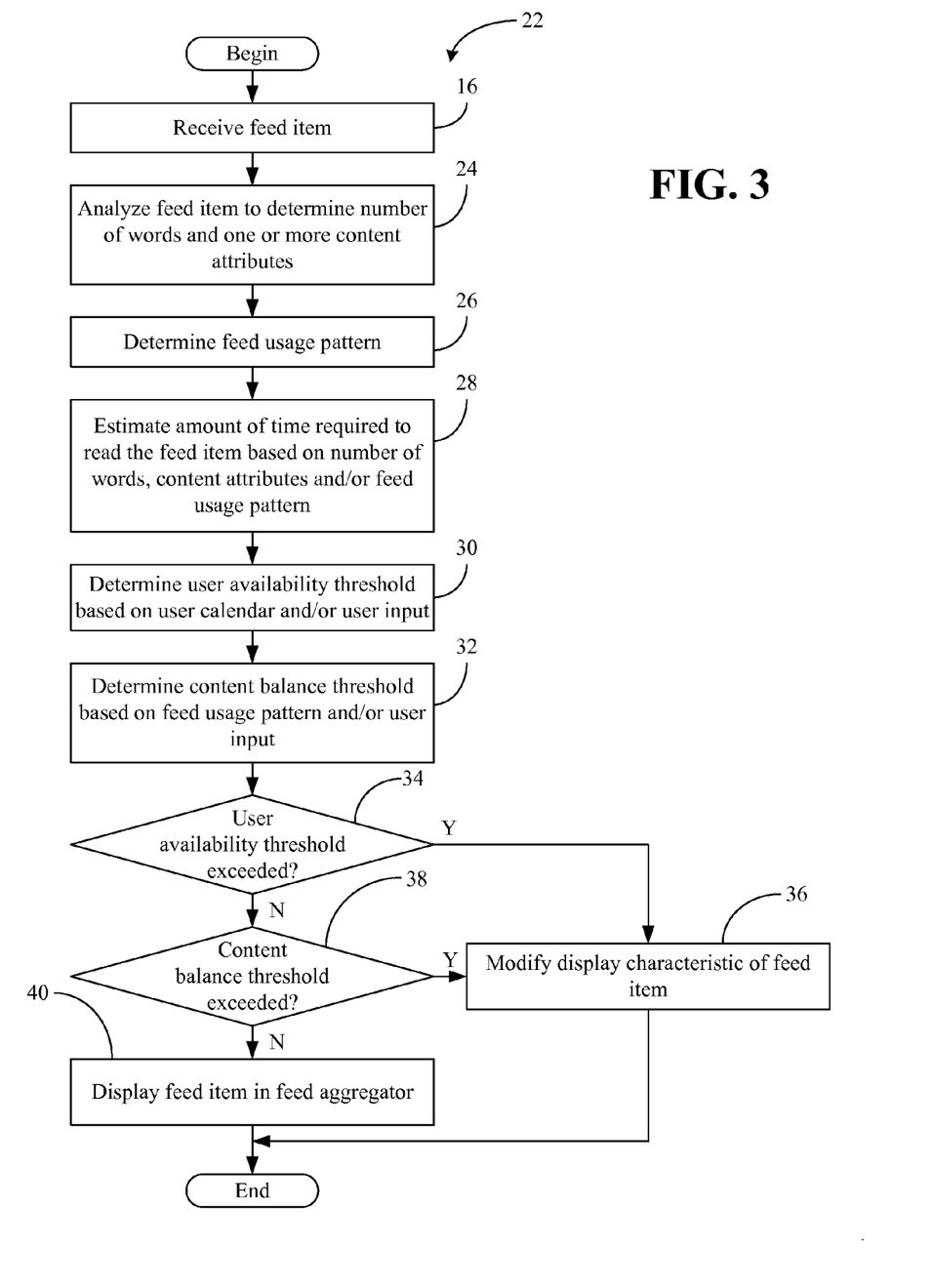
FIG. 3 is a flowchart of an example of a method of using one or more thresholds to prioritize feed items according to an embodiment.

FIG. 3 shows a more detailed example of a method 22 of prioritizing feed items in which one or more thresholds are used. In the illustrated example, a feed item is received at block 16, wherein block 24 may analyze the fee item to determine the number of words in the feed item as well as one or more content attributes. As already noted, the content attributes may include, for example, a topic of the feed item, the source of the feed item, etc. In addition, a feed usage pattern can be determined at block 26, wherein the feed usage pattern could evaluate the rate at which the user has read other feed items having a similar topic, source and/or other content attribute. Illustrated block 28 estimates the amount of time to read the feed item based on, for example, the number of words in the feed item, the content attributes, and/or the feed usage pattern.

A user availability threshold may be determined at block 30 based on a user calendar, user input, etc. In this regard, the user may have more availability to read feed items on different days of the week (e.g., 30 mins/day on weekdays versus 1 hr/day on weekends), at different times of the year (e.g., 2 hrs/day on holidays versus 30 mins/day on work days), and so forth. Indeed, the determination at block 30 could take into consideration individual appointments in analyzing user availability. Moreover, the user could configure his or her availability on-the-fly as needed.

Block 32 may determine a content balance threshold based on the feed usage pattern, user input, etc. For example, it may be determined that the user typically reads more of a certain type of feed item than another. In such a case, the content balance threshold could be set to reflect the historical patterns of the user (e.g., allow a particular blog to consume as much as 40% of the feed aggregator inbox). Such a content balance threshold may also be manually set by the user.

If it is determined at block 34 that the estimated amount of time to read the feed item exceeds the user availability threshold, illustrated block 36 modifies one or more display characteristics of the feed item. Thus, if it is likely to take more time than the user has available to read the feed item, the priority of the feed item may be effectively lowered at block 36. As will be discussed in greater detail, the display characteristic modification could involve delaying the display time of the feed item, digesting the feed item, or canceling the display time of the feed item altogether. If the user availability threshold is not exceeded, block 38 may determine whether the content balance threshold is exceeded by one or more content attributes associated with the feed item. Thus, block 38 could determine whether the topic and/or source of the feed item falls outside of one or more high priority topic areas and/or feed sources. If so, one or more display characteristics of the feed item may be modified at block 36 so as to lower the priority of the feed item. If the estimated amount of time to read the feed item does not exceed the user availability threshold and the content attribute does not exceed the content balance threshold, illustrated block 40 displays the feed item in the feed aggregator.

Figure 4A:
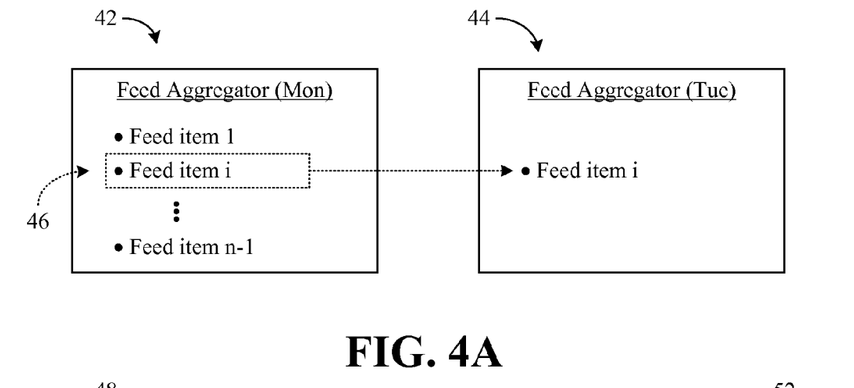
FIG. 4A is a block diagram of an example of a process of delaying a display time of a feed item according to an embodiment.
Figure 4B:
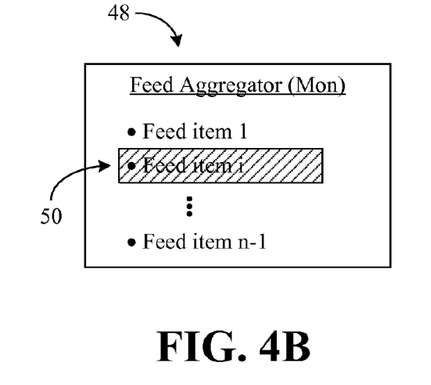
FIG. 4B is a block diagram of an example of a process of canceling a display time of a feed item according to an embodiment.
Figure 4C:
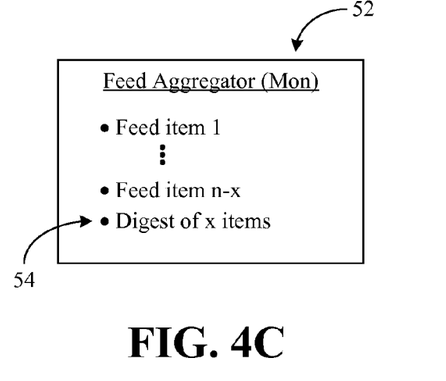
FIG. 4C is a block diagram of an example of a process of digesting feed items according to an embodiment.

FIGS. 4A-4C show various approaches to modifying display characteristics of feed items, as discussed with regard to block 36 (FIG. 3). In particular, FIG. 4A demonstrates that a feed aggregator 42 for a particular day ("Mon") may determine that a certain feed item "Feed item i" 46 should be lowered in priority (e.g., because it exceeds the user availability and/or content balance thresholds). In such a case, the display time of the feed item 46 may be delayed so that the feed item 46 is presented to the user in the feed aggregator 44 on another day ("Tue"). Accordingly, instead of n feed items, the user can be presented with n−1 feed items on the original day in question (e.g., Monday).

Indeed, the delay approach may be particularly useful for feed items originating from "cyclical" feed sources (e.g., feed sources that generate a relatively large number of feed items weekly, bi-weekly, etc.). In such a case, the feed items may be "spread out" over a number of days so as to reduce the item processing burden on the user. The prioritization process may be repeated for multiple feed items in order in order to substantially throttle the amount of content presented to the user.

FIG. 4B demonstrates that a feed aggregator 48 receiving a feed item "Feed item i" 50 that is to be lowered in priority could simply cancel the display time of the feed item 50 so that it is never displayed to the user. Additionally, FIG. 4C shows a feed aggregator 52 in which a digest 54 of feed items can be generated to reduce the number of feed items presented to the user. In general, the digest 54 may be created by generating a summary of the feed items that exceed either the user availability threshold or the content balance threshold, incorporate the summaries into the digest 54, display the digest 54 in the feed aggregator 52, and prevent display of the digested feed items. In the illustrated example, x feed items are digested, which results in n-x actual feed items being presented to the user. Other approaches to re-prioritizing feed items may also be used.

Figure 5:
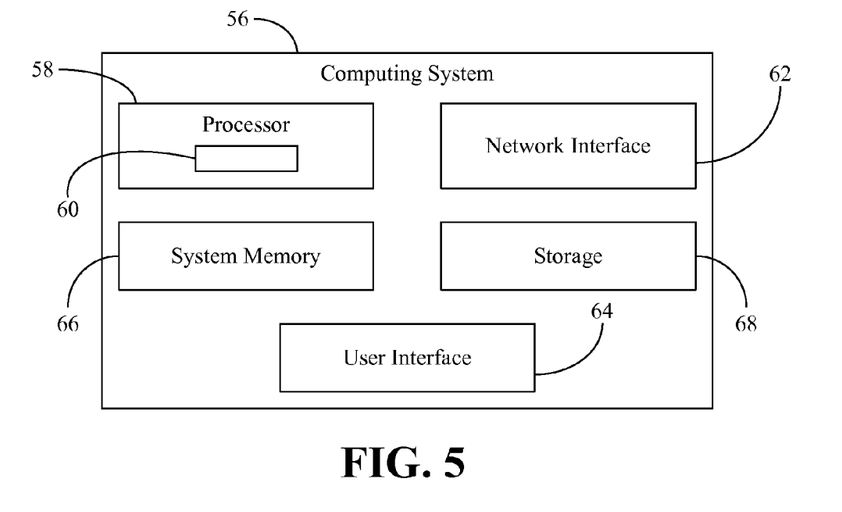
FIG. 5 is a block diagram of an example of a computing system according to an embodiment.

Turning now to FIG. 5, a computing system 56 is shown. The illustrated computing system 56 includes a processor that executes computer usable code 60 configured to receive feed items via a network interface 62 and estimate the amount of time to read the feed items. The computer usable code 60 may also be configured to prioritize the feed items in a feed aggregator based at least in part on the estimates, wherein the feed aggregator can present one or more of the feed items to a user via a user interface 64. The computer usable code 60 may be retrieved by the processor 58 from system memory (e.g, random access memory/RAM) 66, mass storage (e.g., optical drive) 68, or other suitable location. Moreover, the computer usable code 60 could be implemented as embedded logic of the processor 58.

Figure 6:
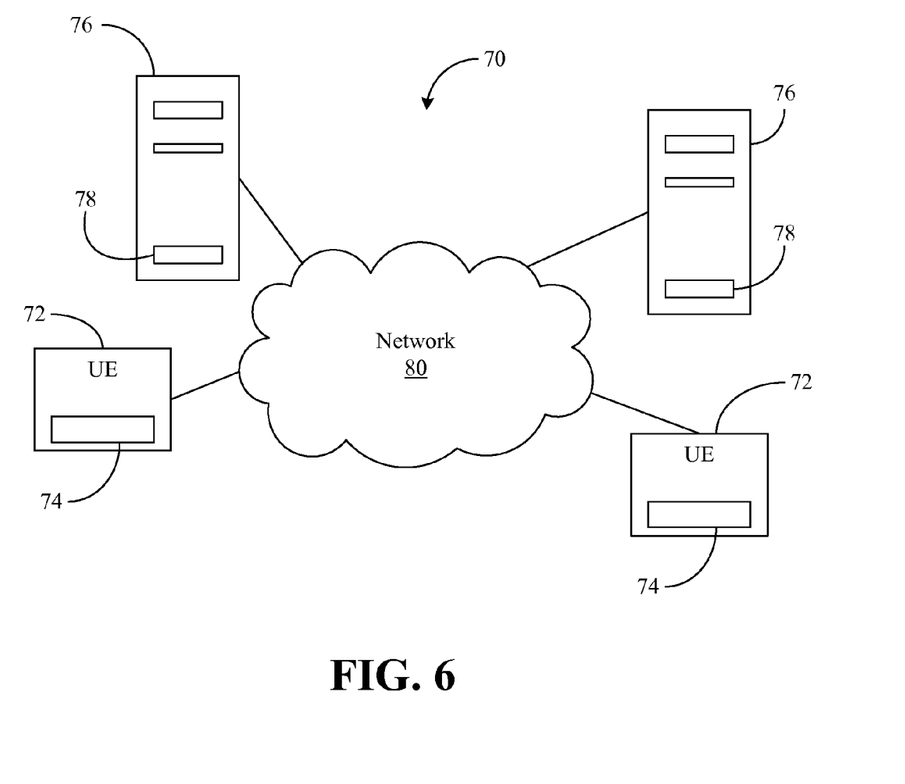
FIG. 6 is a block diagram of an example of a networking architecture according to an embodiment.

FIG. 6 shows a networking architecture 70 in which user equipment (UE) devices 72 include a feed aggregator 74 that receives feed items 78 from servers 76 via a network 80. The network 80 can itself include any suitable combination of servers, access points, routers, base stations, mobile switching centers, public switching telephone network (PSTN) components, etc., to facilitate communication between the UE devices 72 and servers 76. In one example, the feed aggregators 74 are configured to prioritize the feed items 78 based at least in part on the estimated amount of time to read the feed items, as already discussed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
receiving a feed item;
determining a number of words in the feed item;
determining a content attribute associated with the feed item, wherein the content attribute includes at least one of a topic and a source of the feed item;
determining a feed usage pattern;
determining an estimate of an amount of time to read the feed item based on at least one of the number of words, the content attribute and the feed usage pattern;
determining a user availability threshold based on at least one of a user calendar and a first user input;
automatically determining a content balance threshold corresponding to an unread feed item type based on the feed usage pattern, wherein the content balance threshold is set to define a consumption amount of a feed aggregator based on a historical pattern of a user for the feed item type;
displaying the feed item in the feed aggregator based on an automatic comparison of the estimate with the user availability threshold and the content attribute with the content balance threshold, wherein the feed item is displayed if the comparison determines that the estimate of the amount of time to read the feed item does not exceed the user availability threshold and determines that the content attribute does not exceed the content balance threshold; and
modifying a display characteristic of the feed item to at least delay a display of the feed item in the feed aggregator if either the comparison determines that the estimate of the amount of time to read the feed item exceeds the user availability threshold or determines that the content attribute exceeds the content balance threshold, wherein delaying the display of the feed item includes presenting the feed item in a different feed aggregator for a different day.

2. The method of claim 1, further including determining whether the feed item is associated with a cyclical feed source, wherein the display is delayed based on a determination that the feed item is associated with the cyclical feed source.

3. The method of claim 1, wherein modifying the display characteristic includes canceling a display time of the feed item.

4. The method of claim 1, wherein modifying the display characteristic includes:
generating a summary of the feed item;
incorporating the summary of the feed item into a digest;
displaying the digest in the feed aggregator; and
preventing display of the feed item.

5. A computer program product comprising:
a computer readable storage medium; and
computer usable code stored on the computer readable storage medium, where, if executed by a processor, the computer usable code causes a computer to:
receive a feed item;
determine a number of words in the feed item;
determine a content attribute associated with the feed item, wherein the content attribute is to include at least one of a topic and a source of the feed item;
determine a feed usage pattern;
determine an estimate of an amount of time to read the feed item based on at least one of the number of words, the content attribute and the feed usage pattern;
determine a user availability threshold based on at least one of a user calendar and a first user input;
automatically determine a content balance threshold that is to correspond to an unread feed item type based on the feed usage pattern, wherein the content balance threshold is to be set to define a consumption amount of a feed aggregator based on a historical pattern of a user for the feed item type;
display the feed item in the feed aggregator based on an automatic comparison of the estimate with the user availability threshold and the content attribute with the content balance threshold, wherein the feed item is to be displayed if the comparison determines that the estimate of the amount of time to read the feed item does not exceed the user availability threshold and determines that the content attribute does not exceed the content balance threshold; and
modify a display characteristic of the feed item to at least delay a display of the feed item in the feed aggregator if either the comparison determines that the estimate of the amount of time to read the feed item exceeds the user availability threshold or determines that the content attribute exceeds the content balance threshold, wherein delaying the display of the feed item includes presenting the feed item in a different feed aggregator for a different day.

6. The computer program product of claim 5, wherein the computer usable code, if executed, causes a computer to determine whether the feed item is associated with a cyclical feed source, wherein the display is to be delayed based on a determination that the feed item is associated with the cyclical feed source.

7. The computer program product of claim 5, wherein the computer usable code, if executed, causes a computer to:
generate a summary of the feed item if either the comparison determines that estimate of the amount of time to read the feed item exceeds the user availability threshold or determines that the content attribute exceeds the content balance threshold;
incorporate the summary of the feed item into a digest;
display the digest in the feed aggregator; and
prevent display of the feed item.

8. A computer program product comprising:
a computer readable storage medium; and
computer usable code stored on the computer readable storage medium, where, if executed by a processor, the computer usable code causes a computer to:
receive a feed item;
determine an estimate of an amount of time to read the feed item;
determine a user availability threshold;
identify a content attribute associated with the feed item;
automatically determine a content balance threshold that is to correspond to an unread feed item type based on a feed usage pattern, wherein the content balance threshold is to be set to define a consumption amount of a feed aggregator based on a historical pattern of a user for the feed item type; and
prioritize the feed item in the feed aggregator based at least in part on a comparison of the estimate of the amount of time to read the feed item with the user availability threshold and the content attribute with the content balance threshold, wherein the feed item is to be displayed if the comparison determines that the estimate of the amount of time to read the feed item does not exceed the user availability threshold and determines that the content attribute does not exceed the content balance threshold, and wherein a display characteristic of the feed item is to be modified to at least delay the display of the feed item in the feed aggregator if either the comparison determines that the estimate of the amount of time to read the feed item exceeds the user availability threshold or determines that the content attribute exceeds the content balance threshold, and wherein delaying the display of the feed item includes presenting the feed item in a different feed aggregator for a different day.

9. The computer program product of claim 8, wherein the computer usable code, if executed, causes a computer to determine a number of words in the feed item, wherein the estimate is to be determined based on at least one of the feed usage pattern, the number of words, and the content attribute.

10. The computer program product of claim 9, wherein the content attribute is to include at least one of a topic and a source of the feed item.

11. The computer program product of claim 8, wherein the computer usable code, if executed, causes a computer to determine the user availability threshold based on at least one of a user calendar and a user input.

12. The computer program product of claim 8, wherein the computer usable code, if executed, causes a computer to determine whether the feed item is associated with a cyclical feed source, wherein the display is to be delayed based on a determination that the feed item is associated with the cyclical feed source.

13. computer program product of claim 8, wherein the computer usable code, if executed, causes a computer to:
   generate a summary of the feed item if the comparison determines that the estimate of the amount of time to read the feed item exceeds the user availability threshold;
   incorporate the summary of the feed item into a digest;
   display the digest in the feed aggregator; and
   prevent display of the feed item.

\* \* \* \* \*